United States Patent
Kao et al.

(10) Patent No.: US 11,486,052 B2
(45) Date of Patent: Nov. 1, 2022

(54) ELECTROPOLISHING TREATMENT METHOD FOR STAINLESS STEEL WORKPIECE

(71) Applicant: NATIONAL CHUNG SHAN INSTITUTE OF SCIENCE AND TECHNOLOGY, Taoyuan (TW)

(72) Inventors: Chun-Hsiang Kao, Taoyuan (TW); Yi-Cherng Ferng, Taoyuan (TW); Kuo-Kuang Jen, Taoyuan (TW); Shun-Yi Jian, Taoyuan (TW); Ming-Hsien Lin, Taoyuan (TW); Yu-Chih Tzeng, Taoyuan (TW); Chia-Yu Lee, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 0 days.

(21) Appl. No.: 17/562,032

(22) Filed: Dec. 27, 2021

(65) Prior Publication Data
US 2022/0205128 A1  Jun. 30, 2022

(30) Foreign Application Priority Data

Dec. 28, 2020  (TW) .................... 109146382

(51) Int. Cl.
*C25F 3/24* (2006.01)
*B33Y 80/00* (2015.01)

(52) U.S. Cl.
CPC ............... *C25F 3/24* (2013.01); *B33Y 80/00* (2014.12)

(58) Field of Classification Search
CPC ............. C25F 3/24; B22F 10/62; B22F 10/68
See application file for complete search history.

(56) References Cited

FOREIGN PATENT DOCUMENTS

WO  WO-2020248340 A1 * 12/2020 .............. B22F 10/20

OTHER PUBLICATIONS

English translation WO2020248340 (Year: 2020).*

* cited by examiner

*Primary Examiner* — Jason L Vaughan
*Assistant Examiner* — Amanda Kreiling

(57) ABSTRACT

Provides an electropolishing treatment method for a stainless steel workpiece, wherein the method comprises the following steps: placing the stainless steel workpiece in an oxalic acid solution and performing supersonic oscillation; performing a first electropolishing treatment to the stainless steel workpiece, wherein the first electropolishing treatment uses the stainless steel workpiece as an anode and 10% to 15% perchloric acid as an electrolyte, and when a constant voltage is set as 12V, the first electropolishing treatment procedure is performed; and performing a second electropolishing treatment to the stainless steel workpiece, wherein the second electropolishing treatment uses the stainless steel workpiece after the first electropolishing treatment as an anode, and an electrolyte consists of ethanol, sulfuric acid and perchloric acid, and when a constant voltage is set as 12V, the second electropolishing treatment is performed to obtain the stainless steel workpiece after the second electropolishing treatment.

8 Claims, 3 Drawing Sheets

ELECTROPOLISHING TREATMENT METHOD FOR STAINLESS STEEL WORKPIECE

CROSS-REFERENCE TO RELATED APPLICATION

This non-provisional application claims priority under 35 U.S.C. § 119(a) on Patent Application No(s).109146382 filed in Taiwan, R.O.C. on Dec. 28, 2020, the entire contents of which are hereby incorporated by reference.

BACKGROUND OF THE INVENTION

1. Field of the Invention

The present disclosure relates to an electropolishing treatment method, and in particular to an electropolishing treatment method for a stainless steel workpiece.

2. Description of the Related Art

Metal additive manufacturing is one of the key technologies in the current manufacture of ultra-precision metal components, which can effectively meet the processing needs of high-value molds, special specification metal components and complex structural morphologies and internal flow channels, and is the developmental trend of the metal precision processing industry in the future. Among them, the metal additive manufacturing 17-4PH® stainless steel workpiece has become one of the main application materials of national defense, aerospace and medical industry in the future because of its high strength, hardness, ductility and corrosion resistance. However, the above-mentioned industries have a considerably high requirement for the dimensional accuracy of the metal additive manufacturing 17-4PH® stainless steel workpiece, and have a higher requirement for the flatness and roughness of the workpiece surface, especially in the complex twisting surface and sheet characteristics of the blade workpiece, it has a deeper technical difficulty. The reason is that improving the surface roughness of the material can not only prevent the stress concentration caused by material surface defects, but also reduce mechanical vibration and wear, and can further increase the service life of the workpiece material.

Although the metal additive manufacturing can produce metal products that have complex morphologies, complex flow channels and internal structure, the products have the disadvantage of excessive surface roughness, so it is necessary to carry out the subsequent processing to meet the needs of commercialization. Current precision grinding and polishing processes such as grinding, lapping, mechano-chemical polishing, chemo-mechanical polishing, all have shape and precision limitations, and the phenomenon of processing deterioration layers and residual stresses will occur. Although the electropolishing surface treatment process has the advantages of no processing deterioration layer produced on the polishing surface, no additional stress and capable of processing complex shape and small workpieces, it is important that electropolishing technology is also affected by metal surface structure, electrolyte formulation, temperature, current density and voltage, etc. All the above parameters may easily cause the uneven dissolution of the anode in the electropolishing process, which causes that the polishing workpiece fails to achieve the expected roughness and gloss. In other words, there is no good electropolishing treatment method for the 17-4PH® stainless steel produced by the additive manufacturing and the flatness and roughness of the surface of the stainless objects.

BRIEF SUMMARY OF THE INVENTION

In view of the disadvantages of the above-mentioned prior art, a main object of the present disclosure is to provide an electropolishing treatment method for a stainless steel workpiece, so that the average surface roughness of the stainless steel workpiece can reach a level <1.6 µm.

Another object of the present disclosure is to provide a two-stage electropolishing treatment method for a stainless steel workpiece, which can solve the problems of residual stress and processing direction produced by traditional machining, so that the surface properties of the whole workpiece are homogeneous.

A further object of the present disclosure is to provide a two-stage electropolishing treatment method for a stainless steel workpiece, the electrolyte formulation is mainly composed of acidic solution and ethanol solution, the operation is simple and the solution formulation is easy to obtain, and automatic electropolishing processes can be introduced in the future, a number of workpieces can be simultaneously polished and leveled in a short period of time, in order to achieve the purpose of high efficient production.

To achieve the above objects, an electropolishing treatment method for a stainless steel workpiece provided according to the present disclosure comprises the following steps: placing the stainless steel workpiece in an oxalic acid solution and performing supersonic oscillation; performing a first electropolishing treatment to the stainless steel workpiece, wherein the first electropolishing treatment uses the stainless steel workpiece as an anode and 10% to 15% perchloric acid as an electrolyte, and when a constant voltage is set as 12V to 15V, the first electropolishing treatment procedure is performed; and performing a second electropolishing treatment to the stainless steel workpiece, wherein the second electropolishing treatment uses the stainless steel workpiece after the first electropolishing treatment as an anode, and an electrolyte consists of ethanol, sulfuric acid and perchloric acid, and when a constant voltage is set as 12V to 15V, the second electropolishing treatment is performed to obtain the stainless steel workpiece after the second electropolishing treatment.

In the above description, the electrolyte of the second electropolishing treatment consists of 90% to 93% ethanol, 4% to 7% sulfuric acid and 2% to 3% perchloric acid.

In the above description, the time of the first electropolishing treatment is between 5 and 10 minutes.

In the above description, the time of the second electropolishing treatment is between 15 and 20 minutes.

In the above description, the stainless steel workpiece is a workpiece produced by an additive manufacturing equipment.

In the above description, the stainless steel workpiece is a 17-4PH® stainless steel workpiece.

In the above description, the stainless steel workpiece is a stainless steel workpiece of heat treatment state or additive manufacturing state.

In the above description, the time of the supersonic oscillation is between 60 and 70 minutes.

The above summary description and the following detailed description and the accompanying drawings are the way, means and effect made for further describing the disclosure which can achieve a predetermined object. Other objects and advantages of the disclosure will become apparent from the following description and the drawings.

DETAILED DESCRIPTION OF THE INVENTION

The implementation of the disclosure is further described by the specific embodiments as below, and a person having ordinary skill in the art can easily understand other advantages and effects of the present disclosure by the content of the specification. Furthermore, unless otherwise specified, the concentration "%" indicated in the present specification is "volume percentage concentration %".

Figure 1:
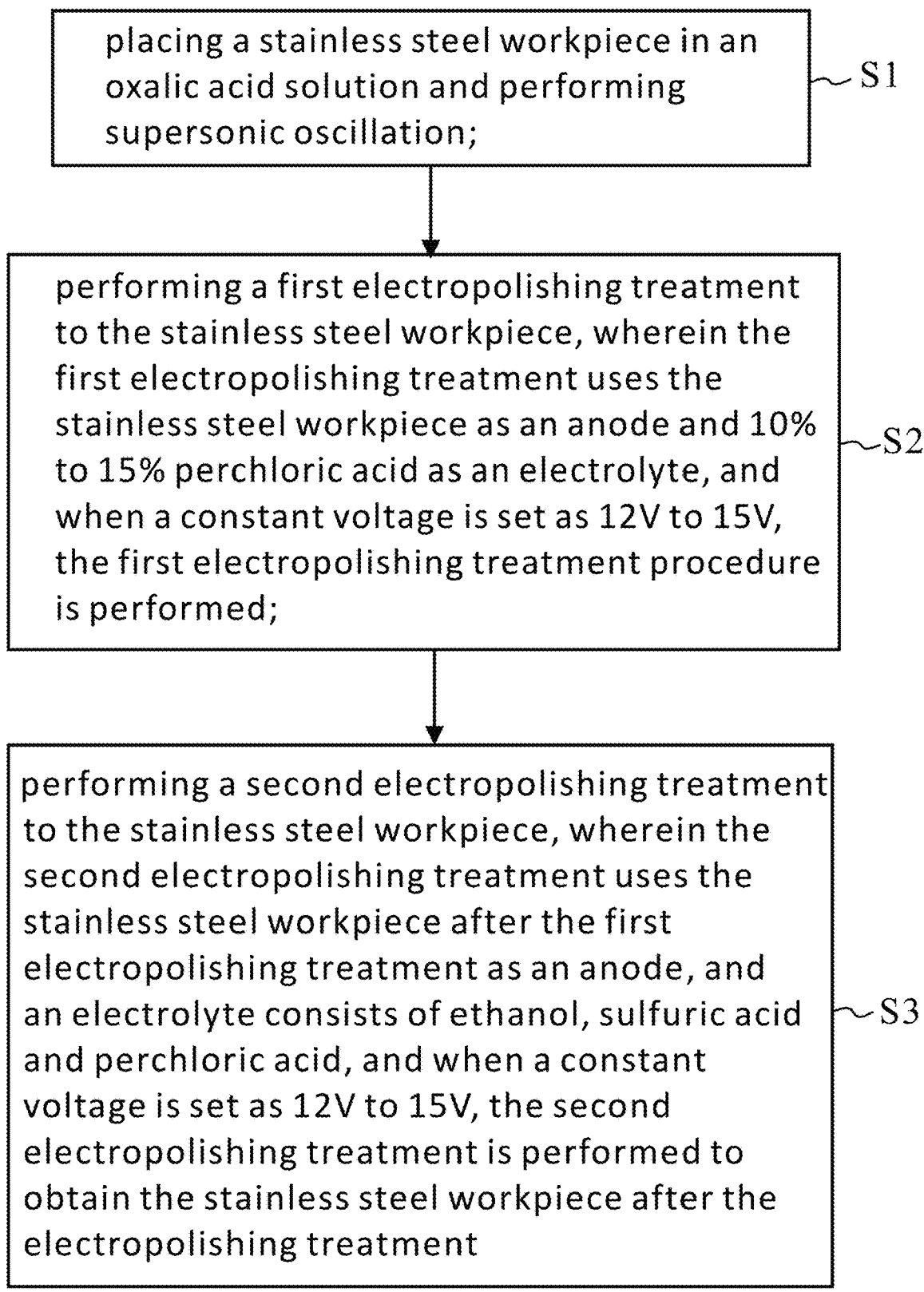
FIG. 1 is a flow chart of steps of an electropolishing treatment method for a stainless steel workpiece of the disclosure.

The disclosure provides an electropolishing treatment method for a stainless steel workpiece, referring to FIG. 1, FIG. 1 is a flow chart of steps of an electropolishing treatment method for a stainless steel workpiece of the disclosure.

As shown in FIG. 1, an electropolishing treatment method for a stainless steel workpiece comprises the following steps: placing the stainless steel workpiece in an oxalic acid solution and performing supersonic oscillation, S1; performing a first electropolishing treatment to the stainless steel workpiece, wherein the first electropolishing treatment uses the stainless steel workpiece as an anode and 10% to 15% perchloric acid as an electrolyte, and when a constant voltage is set as 12V to 15V, the first electropolishing treatment procedure is performed, S2; and performing a second electropolishing treatment to the stainless steel workpiece, wherein the second electropolishing treatment uses the stainless steel workpiece after the first electropolishing treatment as an anode, and an electrolyte consists of ethanol, sulfuric acid and perchloric acid, and when a constant voltage is set as 12V to 15V, the second electropolishing treatment is performed to obtain the stainless steel workpiece after the second electropolishing treatment, S3.

Embodiment 1

First Electropolishing:

First, the additive manufacturing 17-4PH® stainless steel workpiece is placed in 10% oxalic acid solution to perform supersonic acid cleaning for 1 hour, and then the workpiece is used as an anode, placed in an electrolyte of 10% to 15% perchloric acid to perform electropolishing at a constant voltage of 12V for 10 minutes.

Second Electropolishing:

The additive manufacturing 17-4PH® stainless steel workpiece that is finished through the first electropolishing is placed in an electrolyte (electrolyte consists of 90% to 93% ethanol, 4% to 7% sulfuric acid and 2% to 3% perchloric acid) to perform electropolishing at a constant voltage of 12V for 20 minutes.

The cathode in the embodiment, for example, may be but not limited to a platinum electrode, graphite electrode, titanium electrode or tungsten gold electrode.

Figure 2:
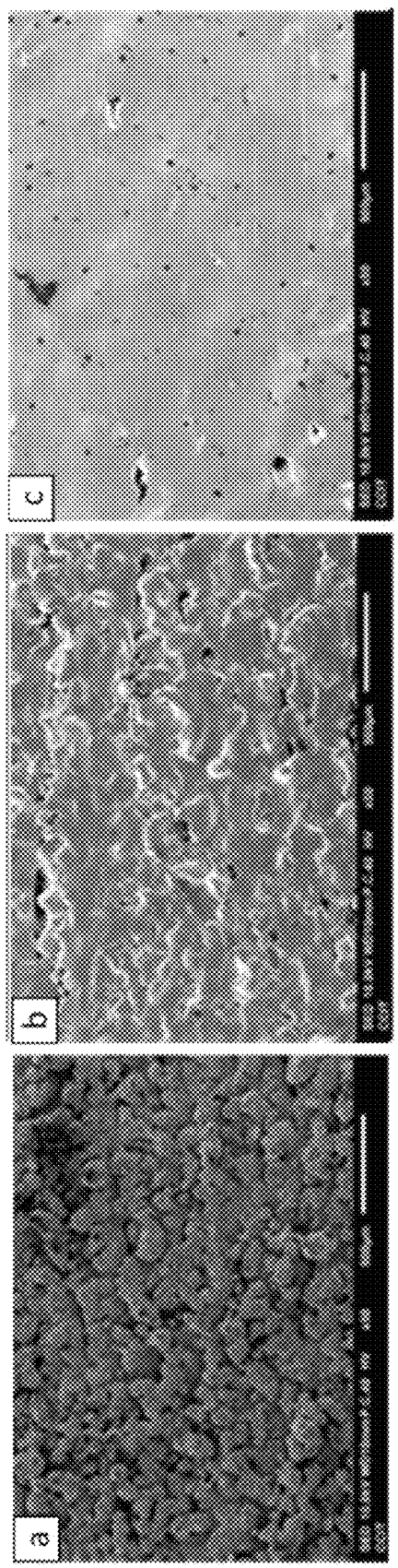
FIG. 2 shows SEM images of the workpiece at each stage of the electropolishing treatment method for the stainless steel workpiece of the present disclosure.
Figure 3:
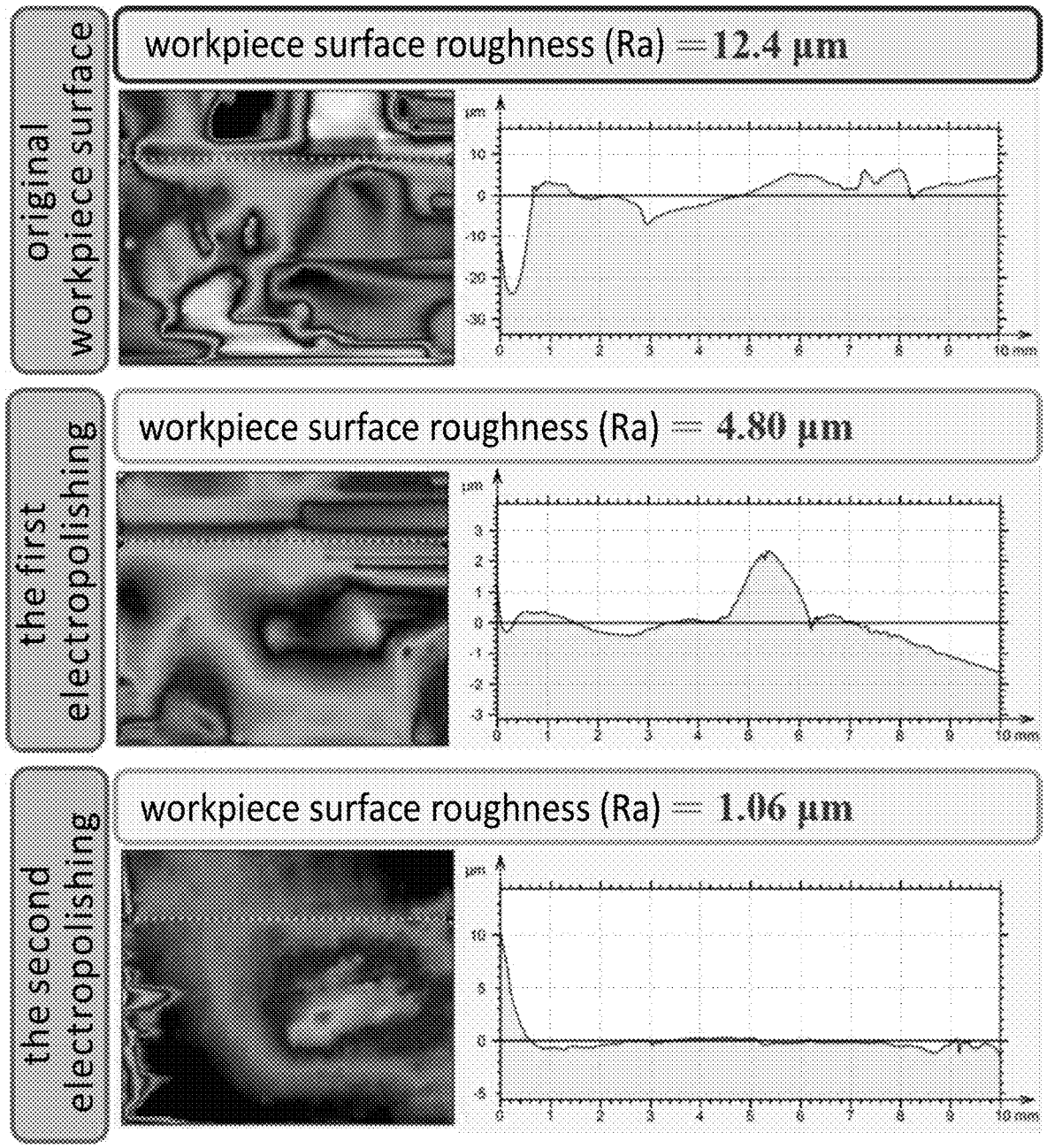
FIG. 3 shows 3D white light roughness measuring graphs of the workpiece at each stage of the electropolishing treatment method for the stainless steel workpiece of the present disclosure.

Referring FIGS. 2 and 3, FIG. 2 shows SEM images of the workpiece at each stage of the electropolishing treatment method for the stainless steel workpiece of the present disclosure, and FIG. 3 shows 3D white light roughness measuring graphs of the workpiece at each stage of the electropolishing treatment method for the stainless steel workpiece of the present disclosure.

As shown in FIGS. 2 and 3, in FIG. 2, (a) is the surface of the original workpiece, (b) is the surface after the first electropolishing and (c) is the surface after the second electropolishing, it can be known from the above results that the two electropolishing processes of the present disclosure (electrolyte formulation, voltage parameters and reaction time) can make the surface roughness of the additive manufacturing 17-4PH® stainless steel workpiece significantly drop from the original value of 12.4 μm to 1.076 μm, in order to achieve the overall smooth and flat morphology. It shows the two electropolishing processes of the present disclosure can be effectively applied to the additive manufacturing 17-4PH® stainless steel workpiece.

The electropolishing working steps of the disclosure can be divided into three steps, the workpiece sample is placed at the anode, when electropolishing, the workpiece sample at the anode produces a dissolution reaction to perform steps of leveling, smoothing and glossing, in order to achieve the polishing effect, and the principle of each step is described below.

Leveling

At the beginning of the reaction, the surface of the test plate is rough, at this time the electric field intensity at the high point of the metal surface is large, the high point of the surface occurs dissolved phenomenon, on the contrary, the low point is less affected by the dissolution speed because of the low electric field intensity, the de-leveling effect of this stage is the largest in the overall process. After a period of reaction, the initial leveling effect can be achieved, and this step also removes surface impurities.

Smoothing

When the reaction enters this stage, metal ions are released from the surface of the object at the time of electrolysis, dissolved into the electrolyte, combined to acid group ions in the electrolyte to form a film (barrier layer) of the reaction product on the anode surface, which will vary depending on the electrolyte. Although the thickness of the barrier layer is thin, the resistance caused by the barrier layer is very high, the same a height difference is formed on the surface as treated, resulting in the dissolution at the high point, a small electric field concentration at the low point because of a protective effect. After the high point of the substrate surface is dissolved for a long time, the height difference of the surface is gradually shortened, so as to achieve the smoothing effect of the surface.

Glossing

The step is used to eliminate the microroughness surface of the surface. In this stage, the viscous layer distributed on the substrate surface is the site where trace polishing occurs. At this time, the anode current density becomes very small, resulting in a trace amount of removal at the microscopic high point, while a protective effect is formed at the low point, it does not produce dissolution, so that the substrate achieves a brightening effect.

As one of the key materials for national defense, aviation and medical industry in the future, that is, the additive manufacturing 17-4PH® stainless steel, and the present disclosure was carried out based on the needs of the abovementioned precision processing industry. Therefore, an additive manufacturing plant or precision parts processing plant can adopt the present disclosure, the product is widely used and has a great prospect of economic profit.

The above embodiments of the disclosure made only by way of example to describe the feature and effect of the disclosure, and it should not be considered as the scope of substantial technical content is limited thereby. Various possible modifications and alternations of the embodiments could be carried out by the those of ordinary skill in the art without departing from the spirit and scope of the disclosure. Therefore, the scope of the disclosure is based on the appended claims.

What is claimed is:

1. An electropolishing treatment method for a stainless steel workpiece, comprising following steps:

placing the stainless steel workpiece in an oxalic acid solution and performing supersonic oscillation;

performing a first electropolishing treatment to the stainless steel workpiece, wherein the first electropolishing treatment uses the stainless steel workpiece as an anode and 10% to 15% perchloric acid as an electrolyte, and when a constant voltage is set as 12V to 15V, the first electropolishing treatment procedure is performed; and performing a second electropolishing treatment to the stainless steel workpiece, wherein the second electropolishing treatment uses the stainless steel workpiece after the first electropolishing treatment as an anode, and an electrolyte consists of ethanol, sulfuric acid and perchloric acid, and when a constant voltage is set as 12V to 15V, the second electropolishing treatment is performed to obtain the stainless steel workpiece after the second electropolishing treatment.

2. The electropolishing treatment method for a stainless steel workpiece according to claim 1, wherein the electrolyte of the second electropolishing treatment consists of 90% to 93% ethanol, 4% to 7% sulfuric acid and 2% to 3% perchloric acid.

3. The electropolishing treatment method for a stainless steel workpiece according to claim 1, wherein the time of the first electropolishing treatment is between 5 and 10 minutes.

4. The electropolishing treatment method for a stainless steel workpiece according to claim 1, wherein the time of the second electropolishing treatment is between 15 and 20 minutes.

5. The electropolishing treatment method for a stainless steel workpiece according to claim 1, wherein the stainless steel workpiece is a workpiece produced by an additive manufacturing equipment.

6. The electropolishing treatment method for a stainless steel workpiece according to claim 1, wherein the stainless steel workpiece is a 17-4PH® stainless steel workpiece.

7. The electropolishing treatment method for a stainless steel workpiece according to claim 1, wherein the stainless steel workpiece is a stainless steel workpiece of heat treatment state or additive manufacturing state.

8. The electropolishing treatment method for a stainless steel workpiece according to claim 1, wherein the time of the supersonic oscillation is between 60 and 70 minutes.

* * * * *